(12) United States Patent
Zhang

(10) Patent No.: US 12,504,851 B2
(45) Date of Patent: Dec. 23, 2025

(54) APPARATUS AND METHOD FOR 3D VIEWING WITH GRATING BETWEEN BACKLIGHT AND LC TOUCH DISPLAY PANEL

(71) Applicants: Hefei BOE Optoelectronics Technology Co., Ltd., Anhui (CN); BOE Technology Group Co., Ltd., Beijing (CN)

(72) Inventor: Douqing Zhang, Beijing (CN)

(73) Assignees: Hefei BOE Optoelectronics Technology Co., Ltd., Anhui (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 18/023,684

(22) PCT Filed: Apr. 14, 2022

(86) PCT No.: PCT/CN2022/086894
§ 371 (c)(1),
(2) Date: Feb. 27, 2023

(87) PCT Pub. No.: WO2023/197262
PCT Pub. Date: Oct. 19, 2023

(65) Prior Publication Data
US 2024/0288970 A1    Aug. 29, 2024

(51) Int. Cl.
*G06F 3/041* (2006.01)
*G02F 1/1368* (2006.01)
*H04N 13/398* (2018.01)

(52) U.S. Cl.
CPC ........ *G06F 3/04184* (2019.05); *G02F 1/1368* (2013.01); *G06F 3/0412* (2013.01); *H04N 13/398* (2018.05)

(58) Field of Classification Search
CPC .. G06F 3/04184; G06F 3/0412; G02F 1/1368; H04N 13/398; G02B 5/18
See application file for complete search history.

(56) References Cited

U.S. PATENT DOCUMENTS

| | | |
|---|---|---|
| 2011/0149047 A1 | 6/2011 | Min et al. |
| 2012/0182488 A1 | 7/2012 | Kuwajima et al. |
| 2013/0038811 A1 | 2/2013 | Sugita et al. |
| 2013/0335463 A1 | 12/2013 | Chiang et al. |
| 2014/0125887 A1 | 5/2014 | Wu et al. |
| 2015/0160495 A1 | 6/2015 | Yang |
| 2017/0374356 A1* | 12/2017 | Lu .................. H04N 13/398 |
| 2018/0270475 A1 | 9/2018 | Gao et al. |
| 2019/0204640 A1* | 7/2019 | Li .................... G02F 1/1343 |

(Continued)

FOREIGN PATENT DOCUMENTS

| | | |
|---|---|---|
| CN | 102692748 A | 9/2012 |
| CN | 102914895 A | 2/2013 |

(Continued)

*Primary Examiner* — Liliana Cerullo
(74) *Attorney, Agent, or Firm* — IPro, PLLC

(57) ABSTRACT

The present disclosure relates to a display apparatus and a drive method thereof. The display apparatus includes a backlight module; a liquid crystal touch display panel, located on a light emitting side of the backlight module; and a liquid crystal grating panel, located between the backlight module and the liquid crystal touch display panel.

16 Claims, 7 Drawing Sheets

(56) References Cited

U.S. PATENT DOCUMENTS

2021/0018778 A1\* 1/2021 Matsushima ..... G02F 1/133528
2021/0165155 A1\* 6/2021 Tan ................... G02F 1/133512

FOREIGN PATENT DOCUMENTS

| CN | 203037967 U | 7/2013 |
| CN | 103293726 A | 9/2013 |
| CN | 103309094 A | 9/2013 |
| CN | 103941445 A | 7/2014 |
| CN | 204155045 U | 2/2015 |
| CN | 204422933 U | 6/2015 |
| CN | 105334632 A | 2/2016 |
| CN | 106932911 A | 7/2017 |
| CN | 107907928 A | 4/2018 |
| CN | 108803052 A | 11/2018 |
| JP | 2012113520 A | 6/2012 |

\* cited by examiner

APPARATUS AND METHOD FOR 3D VIEWING WITH GRATING BETWEEN BACKLIGHT AND LC TOUCH DISPLAY PANEL

CROSS REFERENCE TO RELATED APPLICATIONS

The present disclosure is a National Stage of International Application No. PCT/CN2022/086894, filed Apr. 14, 2022.

FIELD

The present disclosure relates to the technical field of display, in particular to a display apparatus and a drive method thereof.

BACKGROUND

Glass-free 3D display products are preferred by users because they can realize stereoscopic display without the aid of auxiliary tools.

At present, for a glass-free 3D display technology, a large-size touch product generally adopts a non-built-in touch module technology, and a liquid crystal grating is added on a liquid crystal display panel to achieve a glass-free 3D technology. However, for medium and small size products like tablet PCs, a touch module is built in the display panel, that is, an incell technology is adopted. For display products adopting the incell technology, if the liquid crystal grating is directly overlaid on a light emitting side of the display panel, an electrode in the liquid crystal grating will generate a shielding effect on a touch electrode in the touch module, so that the touch electrode cannot sense human finger charges, which will cause the touch failure condition and lead to great reduction of display brightness.

SUMMARY

An embodiment of the present disclosure provides a display apparatus, including:
 a backlight module;
 a liquid crystal touch display panel, disposed on a light emitting side of the backlight module; and
 a liquid crystal grating panel, arranged between the backlight module and the liquid crystal touch display panel.

In some embodiments, the display apparatus further includes:
 a first polarizer, arranged between the liquid crystal grating panel and the backlight module;
 a second polarizer, arranged between the liquid crystal grating panel and the liquid crystal touch display panel; and
 a third polarizer, disposed on a side of the liquid crystal touch display panel facing away from the liquid crystal grating panel.

In some embodiments, the display apparatus further includes:
 a multilayer film reflective polarizer, arranged between the first polarizer and the backlight module.

In some embodiments, the liquid crystal grating panel includes:
 a first array substrate, including a first base substrate and a first transparent electrode layer arranged between the first base substrate and the liquid crystal touch display panel, where the first transparent electrode layer is configured to receive an alternating current drive signal;
 a first liquid crystal layer, arranged between the first array substrate and the liquid crystal touch display panel; and
 a first opposite substrate, arranged between the first liquid crystal layer and the liquid crystal touch display panel, and the first opposite substrate includes a second base substrate and a second transparent electrode layer located between the second base substrate and the first liquid crystal layer, the second transparent electrode layer is configured to receive a direct current drive signal.

In some embodiments, the first transparent electrode layer includes:
 a first sub-electrode layer, including a plurality of first strip electrodes arranged at intervals; and
 a second sub-electrode layer, arranged between the first sub-electrode layer and the first liquid crystal layer, and the second sub-electrode layer includes a plurality of second strip electrodes arranged at intervals, an extending direction of the first strip electrodes and an extending direction of are same, and an orthographic projection of the second strip electrodes on the first base substrate covers an orthographic projection of a region between two adjacent first strip electrodes on the first base substrate;
 the second transparent electrode layer includes a planar electrode arranged in a whole surface mode.

In some embodiments, the display apparatus further includes: a first driver electrically connected with the liquid crystal touch display panel, a second driver electrically connected with the liquid crystal grating panel, and a master controller electrically connected with the first driver and the second driver;
 the master controller is configured to, according to a to-be-displayed image, send first refresh frequency information to the first driver, and send frame frequency information corresponding to the first refresh frequency information and grating drive information to the second driver, where first refresh frequency carried by the first refresh frequency information is the same as first frequency carried by the frame frequency information;
 the first driver is configured to, according to the first refresh frequency information, adopt the first refresh frequency to drive the liquid crystal touch display panel to display the to-be-displayed image, and adopt first drive frequency matched with the first refresh frequency to perform touch recognition in a touch recognition stage; and
 the second driver is configured to, according to the frame frequency information, adjust the drive frequency of the grating drive information and generate a grating drive signal of second drive frequency, where the second drive frequency is different from both the first refresh frequency and the first drive frequency.

In some embodiments, the second driver includes:
 a receiving circuit, configured to receive the frame frequency information and the grating drive information, decode the frame frequency information and output decoding information and the grating drive information;
 a drive signal generating circuit, configured to generate a grating drive signal according to the grating drive information; and a timing controller circuit, configured to adjust a timing of the grating drive signal according to the decoding information and output the grating drive signal of the second drive frequency.

In some embodiments, the timing controller circuit includes:

a serial peripheral interface, configured to output the grating drive signal of the second drive frequency.

In some embodiments, the second drive frequency is greater than the first refresh frequency and smaller than the first drive frequency.

In some embodiments, a difference between a drive frequency of the grating drive signal and the first refresh frequency is greater than or equal to 10 Hz and smaller than or equal to 25 Hz.

In some embodiments, the liquid crystal grating panel includes a first transparent electrode layer and a second transparent electrode layer, and the grating drive signal includes an alternating current drive signal provided for the first transparent electrode layer and a direct current drive signal provided for the second transparent electrode layer.

The present disclosure provides a method for driving a display apparatus, including:

acquiring a to-be-displayed image in a three-dimensional display mode; and driving the liquid crystal touch display panel to display the to-be-displayed image, and driving the liquid crystal grating panel to form a light transmittance region and a dark state region which are arranged alternatively.

In some embodiments, the display apparatus includes the first driver, the second driver and the master controller;

the method further includes: the master controller, according to the to-be-displayed image, sending the first refresh frequency information to the first driver, and sending the frame frequency information corresponding to the first refresh frequency information and the grating drive information to the second driver, where the first refresh frequency carried by the first refresh frequency information is the same as the first frequency carried by the frame frequency information;

driving the liquid crystal touch display panel to display the to-be-displayed image specifically includes:

the first driver, according to the first refresh frequency information, adopting the first refresh frequency to drive the liquid crystal touch display panel to display the to-be-displayed image;

the method further includes:

in the touch recognition stage, adopting the first drive frequency matched with the first refresh frequency to perform touch recognition;

driving the liquid crystal grating panel to form the light transmittance region and the dark state region arranged alternatively specifically includes:

the second driver, according to the frame frequency information, adjusting the drive frequency of the grating drive information, and generating the grating drive signal of the second drive frequency, where the second drive frequency is different from both the first refresh frequency and the first drive frequency.

In some embodiments, the second driver, according to the frame frequency information, adjusting the drive frequency of the grating drive information, and generating the grating drive signal of the second drive frequency specifically includes:

decoding the frame frequency information and outputting the decoding information, and generating the grating drive signal according to the grating drive information; and according to the decoding information, adjusting the timing of the grating drive signal, and outputting the grating drive signal of the second drive frequency.

BRIEF DESCRIPTION OF THE DRAWINGS

In order to more clearly illustrate technical solutions in embodiments of the present disclosure, a brief description of accompanying drawings required for use in the embodiment description will be given below; clearly, the accompanying drawings described below are only some embodiments of the present disclosure, and those ordinarily skilled in the art may further acquire other accompanying drawings according to these accompanying drawings on the premise of not paying creative labor.

DETAILED DESCRIPTION OF THE EMBODIMENTS

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. Obviously, the described embodiments are a part of the embodiments of the present disclosure, not all of them. In addition, the embodiments in the present disclosure and features in the embodiments may be combined with each other without conflict. Based on the embodiments described in the present disclosure, all other embodiments acquired by those ordinarily skilled in the art without the need for creative labor fall within the scope of a protection of the present disclosure.

Unless otherwise defined, technical or scientific terms used herein shall have the ordinary meanings understood by those ordinarily skilled in the art to which the present disclosure pertains. "First", "second" and similar words used in the present disclosure do not indicate any order, quantity or importance, but are only used to distinguish different components. "Comprise" or "include" or other similar words indicate that an element or item appearing before such words covers listed elements or items appearing after the words and equivalents thereof, and do not exclude other elements or items. "Link" or "connect" or other similar words are not limited to physical or mechanical connection, but may include electric connection, no matter direct connection or indirect connection.

It should be noted that the size and shape of figures in the accompanying drawings do not reflect the true scales, and are only aimed to illustrate the content of the present disclosure. Throughout same or similar labels indicate the same or similar components or components having the same or similar functions.

Figure 1:
FIG. 1 is a schematic structural diagram of a display apparatus provided by an embodiment of the present disclosure.

An embodiment of the present disclosure provides a display apparatus, as shown in FIG. 1, including: a backlight module 1; a liquid crystal touch display panel 2 arranged on a light emitting side of the backlight module 1; and a liquid crystal grating panel 3 arranged between the backlight module 1 and the liquid crystal touch display panel 2.

In the display apparatus provided by the embodiment of the present disclosure, the liquid crystal grating panel is arranged between the backlight module and the liquid crystal touch display panel, so that the liquid crystal grating panel cannot shield a touch electrode in the liquid crystal touch display panel, which avoids the problem of a touch failure, and therefore, touch sensitivity and accuracy of the display apparatus may be improved.

It should be illustrated that the liquid crystal grating panel is configured to form a light transmittance region and a dark state region arranged alternatively in a three-dimensional display mode to divide light of a left eye and a right eye into different regions of space, a left-eye image is input into the left eye of a watcher through the light transmittance region, and a right-eye image is input into the right eye of the watcher through the light transmittance region, so that glass-free three-dimensional display is achieved.

In some embodiments, as shown in FIG. 1, the display apparatus further includes: a first polarizer 4 arranged between the liquid crystal grating panel 3 and the backlight module 1; a second polarizer 5 arranged between the liquid crystal grating panel 3 and the liquid crystal touch display panel 2; and a third polarizer 6 arranged on a side of the liquid crystal touch display panel 2 facing away from the liquid crystal grating panel 3.

In some embodiments, the first polarizer and the liquid crystal grating panel, the second polarizer and the liquid crystal grating panel, the second polarizer and the liquid crystal touch display panel, and the third polarizer and the liquid crystal touch display panel are each attached through optical cement.

In some embodiments, the display apparatus further includes a cover plate arranged on one side of the third polarizer facing away from the liquid crystal touch display panel. The third polarizer and the cover plate also may be attached through optical cement.

Figure 2:
FIG. 2 is a schematic structural diagram of another display apparatus provided by an embodiment of the present disclosure.

In some embodiments, as shown in FIG. 2, the display apparatus further includes: a multilayer film reflective polarizer 7 arranged between the first polarizer 4 and the backlight module 1.

It should be illustrated that the multilayer film reflective polarizer is formed by alternatively stacking two materials, one material is a homogeneous medium, the other material is a birefraction material, light is incident to the multilayer film reflective polarizer to be able to achieve effects of birefraction and near-total reflection in a certain frequency range, so that un-emitted light is reused, which may improve a light utilization rate.

In the display apparatus provided by the embodiment of the present disclosure, the multilayer film reflective polarizer is arranged between the first polarizer and the backlight module, the multilayer film reflective polarizer may reuse circularly polarized light emitted from the backlight module but not emitted from the multilayer film reflective polarizer, so as to improve the light utilization rate, and then improve the light emitting brightness of the display apparatus.

Figure 3:
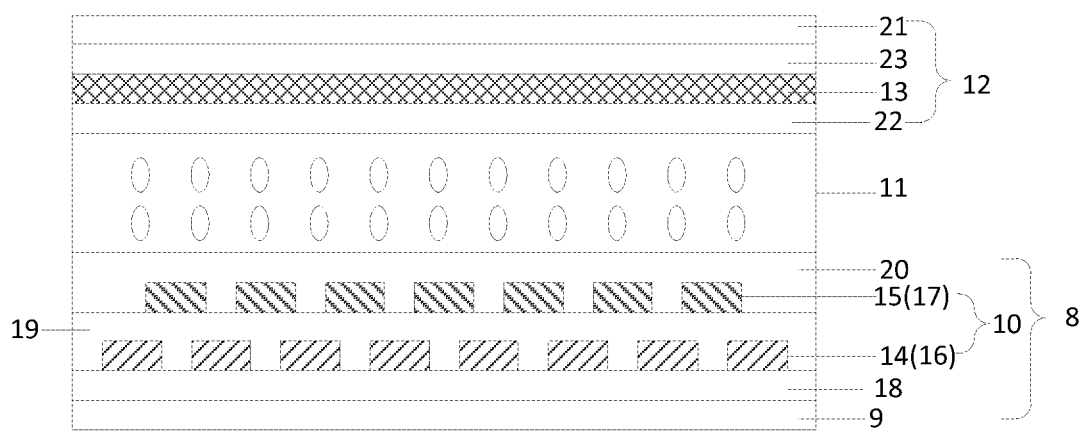
FIG. 3 is a schematic structural diagram of a liquid crystal grating panel provided by an embodiment of the present disclosure.

In some embodiments, as shown in FIG. 3, the liquid crystal grating panel 3 includes: a first array substrate 8 including a first base substrate 9 and a first transparent electrode layer 10 arranged between the first base substrate 9 and the liquid crystal touch display panel 2; a first liquid crystal layer 11 arranged between the first array substrate 8 and the liquid crystal touch display panel; and a first opposite substrate 12 arranged between the first liquid crystal layer 11 and the liquid crystal touch display panel, and including a second base substrate 21 and a second transparent electrode layer 13 arranged between the second base substrate 21 and the first liquid crystal layer 11.

In some embodiments, the first transparent electrode layer and the second transparent electrode layer are loaded with drive signals to enable the liquid crystal grating panel to form the light transmittance region and the dark state region which are arranged alternatively.

Figure 4:
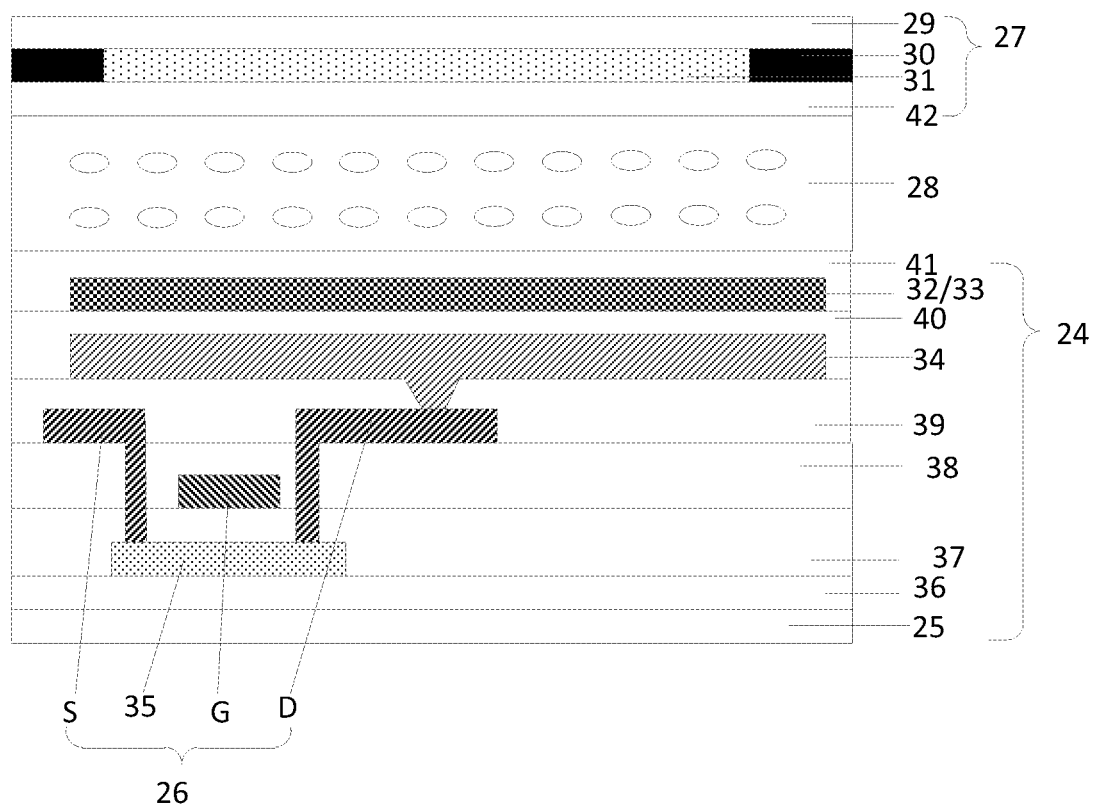
FIG. 4 is a schematic structural diagram of a liquid crystal touch display panel provided by an embodiment of the present disclosure.

In some embodiments, as shown in FIG. 4, the liquid crystal touch display panel includes: a second array substrate 24 including a third base substrate 25, a plurality of thin film transistors 26 arranged on one side of the third base substrate 25 facing away from the liquid crystal grating panel in an array mode, and a plurality of pixel electrodes 34 arranged on one side of the thin film transistors 26 facing away from the third base substrate 25; a second liquid crystal layer 27 arranged on one side of the second array substrate 24 facing away from the liquid crystal grating panel; and a second opposite substrate 28, arranged on one side of the second liquid crystal layer 27 facing away from the second array substrate 24, and including a fourth base substrate 29, and a shading layer 30 and a plurality of color resistances 31 arranged between the fourth base substrate 29 and the second liquid crystal layer 27, where the shading layer 30 includes a plurality of opening regions, and the color resistances 31 are arranged on the opening regions.

In some embodiments, the liquid crystal touch display panel includes a plurality of sub-pixels, the opening regions of the shading layer are in one-to-one correspondence to the sub-pixels, and each sub-pixel includes the thin film transistor and the pixel electrode, that is, the pixel electrodes are in one-to-one correspondence to the thin film transistors. For example, the plurality of sub-pixels include a red sub-pixel, a blue sub-pixel and a green sub-pixel, the corresponding color resistances include a red color resistance corresponding to the red sub-pixel, a blue color resistance corresponding to the blue sub-pixel, and a green color resistance corresponding to the green sub-pixel.

In some embodiments, the liquid crystal touch display panel further includes a common electrode. As shown in FIG. 4, the second array substrate includes a common electrode 32; for example, the common electrode 32 is arranged between the pixel electrode 34 and the second liquid crystal layer 27; or the second opposite substrate includes a common electrode, for example, the common electrode is arranged between the shading layer and the second liquid crystal layer.

In some embodiments, the liquid crystal touch display panel further includes a plurality of touch electrodes.

In some embodiments, as shown in FIG. 4, the common electrode 32 is reused as a touch electrode 33.

In some embodiments, the touch electrode also may be independently arranged.

In some embodiments, as shown in FIG. 4, each thin film transistor 26 includes an active layer 35, a grid electrode G, a source electrode S and a drain electrode D; the second array substrate 24 further includes a first buffer layer 36 arranged between the third base substrate 25 and the active layer 35, a gate insulation layer 37 arranged between the active layer 35 and the grid electrode G, an interlayer insulation layer 38 arranged between the grid electrode G and the source electrode S and between the grid electrode G and the drain electrode D, a first passivation layer 39 arranged between the source electrode S and the pixel electrode 34 and between the drain electrode D and the pixel electrode 34, a second passivation layer 40 arranged between the pixel electrode 34 and the common electrode 32 and a first orientation layer 41 arranged between the common electrode 32 and the second liquid crystal layer 28; and the second opposite substrate 27 further includes a second orientation layer 42 arranged between the shading layer 30 and the second liquid crystal layer 28. The first orientation layer 41 and the second orientation layer 42 are used for orientating liquid crystal molecules in the second liquid crystal layer.

It should be illustrated that FIG. 4 takes the thin-film transistors as top gate structures for example. In some embodiments, the thin-film transistors also may be bottom gate or other structures.

In some embodiments, the touch electrode is configured to receive an alternating current drive signal.

In some embodiments, the first transparent electrode layer is used for receiving an alternating current drive signal, and the second transparent electrode layer is used for receiving a direct current drive signal.

In the display apparatus provided by the embodiment of the present disclosure, the first opposite substrate is closer to the liquid crystal touch display panel than the first array substrate, so that the second transparent electrode layer is closer to the touch electrode. The second transparent electrode layer receives the direct current drive signal, so as to be able to avoid a coupling signal generated when the second transparent electrode layer and the touch electrode which are close in distance both receive the alternating current signal, which avoids the touch failure and may improve the touch accuracy.

In some embodiments, as shown in FIG. 4, the first transparent electrode layer 10 includes: a first sub-electrode layer 14 including a plurality of first strip electrodes 16 arranged at intervals; and a second sub-electrode layer 15 arranged between the first sub-electrode layer 14 and the first liquid crystal layer 11, and including a plurality of second strip electrodes 17 arranged at intervals, where the first strip electrodes 16 and the second strip electrodes 17 have same extending directions, and an orthographic projection of the second strip electrodes 17 on the first base substrate 9 covers an orthographic projection of a region between two adjacent first strip electrodes 16 on the first base substrate 9; the second transparent electrode layer 13 includes a planar electrode arranged in a whole surface mode.

In some embodiments, materials of the first transparent electrode layer and the second transparent electrode layer each include indium tin oxide.

In some embodiments, as shown in FIG. 4, the first array substrate 8 further includes a first insulation layer 18 arranged between the first sub-electrode layer 14 and the first base substrate 9, a second insulation layer 19 arranged between the first sub-electrode layer 14 and the second sub-electrode layer 15 and a third orientation layer 20 arranged on one side of the second sub-electrode layer 15 facing away from the first sub-electrode layer 14; and the first opposite substrate 12 further includes a third insulation layer 23 arranged between the second base substrate 21 and the second transparent electrode layer 13 and a fourth orientation layer 22 arranged on one side of the second transparent electrode layer 13 facing away from the second base substrate 21.

In the display apparatus provided by the embodiment of the present disclosure, the second transparent electrode layer is loaded with the drive signal, part of the first strip electrodes and the second strip electrodes is loaded with the drive signal, and the remaining first strip electrodes and the remaining second strip electrodes are not loaded with the drive signal, so that liquid crystals of a region corresponding to the first strip electrodes and the second strip electrodes loaded with the drive signal deflect, and liquid crystals of remaining regions do not deflect, so as to form the light transmittance region and the dark state region which are arranged alternatively. Moreover, positions of the first strip electrodes and the second strip electrodes loaded with the drive signal may be changed as needed, so as to change the position of the light transmittance region, and therefore, when the position of the watcher is changed, the position of the light transmittance region also may be adjusted accordingly, which causes the watcher to watch the three-dimensional effect at different positions.

In some embodiments, the third orientation layer and the fourth orientation layer are used for orientating the liquid crystal molecules in the first liquid crystal layer.

In some embodiments, the liquid crystal molecules in the first liquid crystal layer may be orientated through the third orientation layer and the fourth orientation layer to cause the liquid crystal molecules to be in twisted Nematic (TN) arrangement, that is, the liquid crystal grating panel provided by the embodiment of the present disclosure is a TN type liquid crystal grating panel. In the first liquid crystal layer of the TN type liquid crystal grating panel, in an unpowered state, the liquid crystal molecules are continuously twisted by 90 degrees between the first array substrate and the first opposite substrate, and when the first transparent electrode layer and the second transparent electrode layer are both loaded with drive voltage, the liquid crystal molecules deflect, and long axes of the liquid crystal molecules are arranged perpendicular to the first array substrate.

In some embodiments, for the TN type liquid crystal grating panel, the direction of a light transmittance axis of the first polarizer is perpendicular to the direction of a light transmittance axis of the second polarizer, the first polarizer converts incident light into linearly polarized light to be incident into the first liquid crystal layer, for a region where the first transparent electrode layer is not loaded with the drive signal, the liquid crystal molecules in the first liquid crystal layer do not deflect, the linearly polarized light passes through the first liquid crystal layer, then rotates by 90 degrees in a polarization direction, and may transmit the second polarizer, and therefore the region where the liquid crystals do not deflect corresponds to the light transmittance region; and for a region where the first transparent electrode layer is loaded with the drive signal, the liquid crystal molecules in the first liquid crystal layer deflect, the polarization direction of the linearly polarized light is not changed after the linearly polarized light passes through the first liquid crystal layer, the linearly polarized light cannot transmit the second polarizer, and therefore the region where the liquid crystals deflect corresponds to the dark state region.

Figure 5:
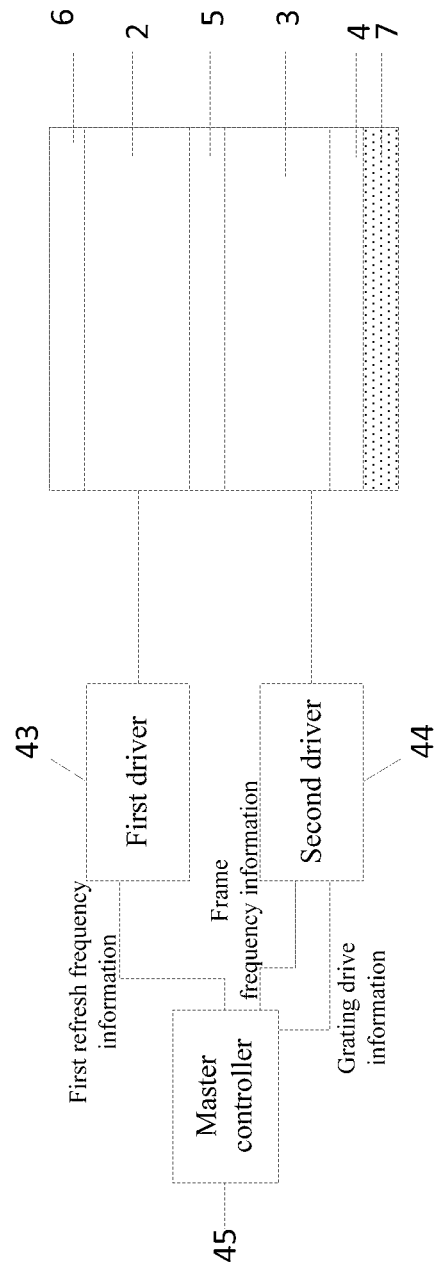
FIG. 5 is a schematic structural diagram of a yet another display apparatus provided by an embodiment of the present disclosure.

In some embodiments, as shown in FIG. 5, the display apparatus further includes: a first driver 43 electrically connected with the liquid crystal touch display panel 2, a second driver 44 electrically connected with the liquid crystal grating panel 3 and a master controller 45 electrically connected with the first driver 43 and the second driver 44; the master controller 45 is configured to, according to a to-be-displayed image, send first refresh frequency information to the first driver 43, and send frame frequency information corresponding to the first refresh frequency information and grating drive information to the second driver 44, where first refresh frequency carried by the first refresh frequency information is the same as first frequency carried by the frame frequency information; the first driver 43 is configured to, according to the first refresh frequency information, adopt the first refresh frequency to drive the liquid crystal touch display panel to display the to-be-displayed image, and adopt first drive frequency matched with the first refresh frequency to perform touch recognition in a touch recognition stage; and the second driver 44 is configured to, according to the frame frequency information, adjust the drive frequency of the grating drive information and generate a grating drive signal of second drive frequency, where the second drive frequency is different from both the first refresh frequency and the first drive frequency.

In the display apparatus provided by the embodiment of the present disclosure, the second drive frequency is different from both the first refresh frequency and the first drive frequency, so as to be able to cause the drive frequency of the liquid crystal grating panel to avoid the refresh frequency and the touch drive frequency of the liquid crystal touch display panel, so that the problems of the influence on the touch accuracy by misinformation points or report failure points and the like caused by the first driver collecting touch information abnormally in the touch stage can be avoided. Moreover, the frequency carried by the frame frequency information sent to the second driver by the master controller is the same as the first refresh frequency carried by the first refresh frequency information sent to the first driver by the master controller, so even if the first refresh frequency changes, the frequency carried by the frame frequency information is changed accordingly, and the grating drive frequency may be dynamically changed by monitoring the first refresh frequency in real time, which causes the drive frequency of the liquid crystal grating panel to avoid the refresh frequency and the touch drive frequency of the liquid crystal touch display panel.

In some embodiments, a ratio of the first drive frequency to the first refresh frequency is an integer. For example, the first drive frequency is twice the first refresh frequency, the first refresh frequency is 60 Hz, and the first drive frequency is 120 Hz.

In some embodiments, the first driver is a touch and display driver integration (TDDI) chip, the first driver may generate a display drive signal according to the first refresh frequency information, so as to adopt the first refresh frequency to drive the liquid crystal touch display panel to display the to-be-displayed image; and moreover, the first driver may generate a touch drive signal of the first drive frequency according to the first refresh frequency information, so as to adopt the first drive frequency matched with the first refresh frequency to perform touch recognition in the touch recognition stage.

Figure 6:
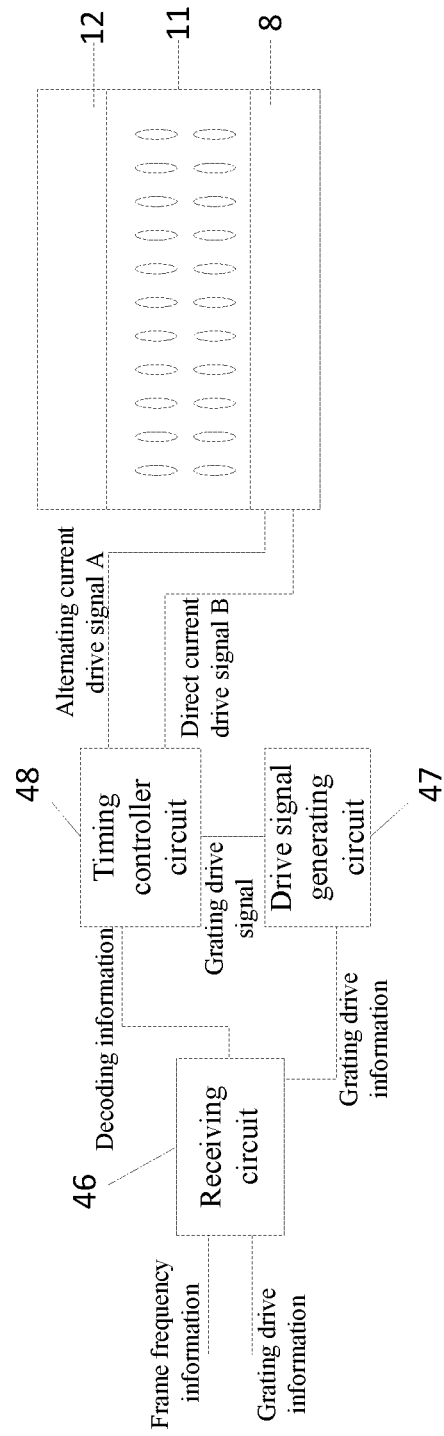
FIG. 6 is a schematic structural diagram of a second driver provided by an embodiment of the present disclosure.

In some embodiments, as shown in FIG. 6, the second driver 44 includes: a receiving circuit 46 configured to receive the frame frequency information and the grating drive information, decode the frame frequency information and output decoding information and the grating drive information; a drive signal generating circuit 47 configured to generate a grating drive signal according to the grating drive information; and a timing controller circuit 48 configured to adjust a timing of the grating drive signal according to the decoding information and output a grating drive signal of the second drive frequency.

In some embodiments, the grating drive signal of the second drive frequency includes an alternating current drive signal A provided for the first transparent electrode layer and a direct current drive signal B provided for the second transparent electrode layer.

In some embodiments, a voltage value of the alternating current drive signal A is 0, and a voltage value of the direct current drive signal B is 5 volts.

In some embodiments, the timing controller circuit includes: a serial peripheral interface, configured to output the grating drive signal of the second drive frequency.

It should be illustrated that the serial peripheral interface (SPI) is a high-speed full-duplex synchronous communication bus, the second driver provided by the embodiment of the present disclosure includes the SPI, the SPI may reserve frequency of burning different grating drive signals for different products, after the first refresh frequency is fixed, best second drive frequency is found according to frame frequency signal debugging, and finally, the grating drive signal of the second drive frequency is output through the SPI to arrive in other circuits in the second driver, so that curing of the second drive frequency may be achieved.

In some embodiments, the second drive frequency is greater than the first refresh frequency and smaller than the first drive frequency.

In some embodiments, a difference between the second drive frequency and the first refresh frequency is greater than or equal to 10 Hz and smaller than or equal to 25 Hz.

In some embodiments, the first refresh frequency may be switched from 60 Hz to 90 Hz and 120 Hz, and correspondingly, the second drive frequency also needs to be changed accordingly. For example, when the first refresh frequency is 60 Hz, the second drive frequency is 70 Hz, when the first refresh frequency is 90 Hz, the second drive frequency is 115 Hz, and when the first refresh frequency is 120 Hz, the second drive frequency is 140 Hz, so that the second drive frequency may be dynamically adjusted along with changing of the first refresh frequency, which ensures the touch accuracy.

It should be illustrated that the second drive frequency may be specifically set according to the first refresh frequency and the first drive frequency, and it only makes sure that the second drive frequency does not disturb the first refresh frequency and the first drive frequency.

In some embodiments, the display apparatus further includes a first flexible circuit board and a second flexible circuit board. In some embodiments, the first driver and the first flexible circuit board are both bound with the second array substrate, the first flexible circuit board is electrically connected with the master controller, and the master controller provides the first refresh frequency information for the first driver through the first flexible circuit board. For example, one end of the second flexible circuit board is bound with the first array substrate, and the other end of the second flexible circuit board is electrically connected with the second driver, so that the second driver provides the grating drive signal for the liquid crystal grating panel through the second flexible circuit board.

In some embodiments, the first array substrate may further include a first connection lead, the first connection lead is electrically connected with the second flexible circuit board, the liquid crystal grating panel further includes conductive silver adhesive, therefore, the second transparent electrode layer is electrically connected with the first connection lead through the conductive silver adhesive, and the direct current drive signal may be transmitted to the second transparent electrode layer through the second flexible circuit board, the first connection lead and the conductive silver adhesive.

In some embodiments, the display apparatus provided by the embodiment of the present disclosure is a mobile phone, a tablet computer, a television, a display, a notebook computer, a digital photo frame, a navigator and any other products or components with touch display functions. Other essential components of the display apparatus shall be understood by those ordinarily skilled in the art, shall not be described here, nor shall be taken as a limitation of the present disclosure.

Figure 7:
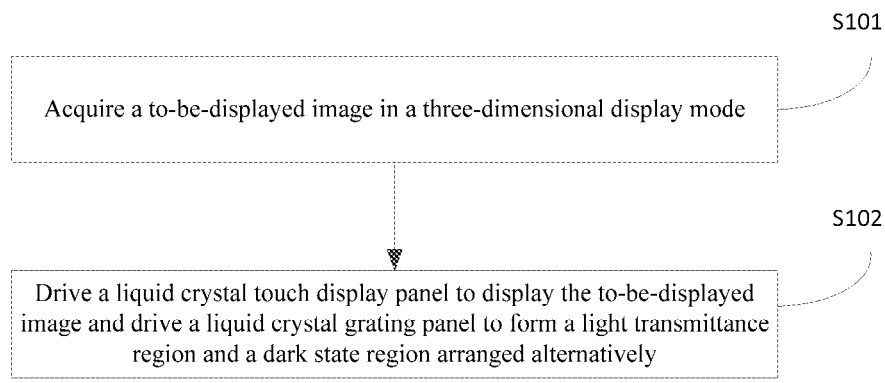
FIG. 7 is a schematic flow diagram of a drive method of a display apparatus provided by an embodiment of the present disclosure.

Based on the same inventive concept, the embodiment of the present disclosure further provides a drive method of the display apparatus, as shown in FIG. 7, including:

S101, acquire a to-be-displayed image in a three-dimensional display mode; and

S102, drive the liquid crystal touch display panel to display the to-be-displayed image, and drive a liquid crystal grating panel to form a light transmittance region and a dark state region which are arranged alternatively.

In the drive method of the display apparatus provided by the embodiment of the present disclosure, the liquid crystal grating panel is driven to form the light transmittance region and the dark state region arranged alternatively in the three-dimensional display mode, light of a left eye and a right eye is divided in different regions of space, a left-eye image is input into the left eye of a watcher through the light transmittance region, and a right-eye image is input into the right eye of the watcher through the light transmittance region, so that glass-free three-dimensional display is achieved.

In some embodiments, the display apparatus includes the first driver, the second driver and the master controller; the method further includes: the master controller, according to the to-be-displayed image, sends the first refresh frequency information to the first driver, and sends the frame frequency information corresponding to the first refresh frequency information and the grating drive information to the second driver, and the first refresh frequency carried by the first refresh frequency information is the same as the first frequency carried by the frame frequency information;

driving the liquid crystal touch display panel to display the to-be-displayed image further includes: the first driver, according to the first refresh frequency information, adopts the first refresh frequency to drive the liquid crystal touch display panel to display the to-be-displayed image;

the method further includes: first drive frequency matched with the first refresh frequency is adopted to perform touch recognition in the touch recognition stage;

driving the liquid crystal grating panel to form the light transmittance region and the dark state region arranged alternatively specifically includes: the second driver, according to the frame frequency information, adjusts the drive frequency of the grating drive information and generates the grating drive signal of the second drive frequency, and the second drive frequency is different from both the first refresh frequency and the first drive frequency.

In the drive method of the display apparatus provided by the embodiment of the present disclosure, the second drive frequency is different from both the first refresh frequency and the first drive frequency, so as to be able to cause the drive frequency of the liquid crystal grating panel to avoid the refresh frequency and the touch drive frequency of the liquid crystal touch display panel, so that the problems of the influence on the touch accuracy by misinformation points or report failure points and the like caused by the first driver collecting touch information abnormally in the touch stage can be avoided. Moreover, the frequency carried by the frame frequency information sent to the second driver by the master controller is the same as the first refresh frequency carried by the first refresh frequency information sent to the first driver by the master controller, so even if the first refresh frequency changes, the frequency carried by the frame frequency information is changed accordingly, and grating drive frequency may be dynamically changed by monitoring the first refresh frequency in real time, which causes the drive frequency of the liquid crystal grating panel to avoid the refresh frequency and the touch drive frequency of the liquid crystal touch display panel.

In some embodiments, the second driver, according to the frame frequency information, adjusting the drive frequency of the grating drive information, and generating the grating drive signal of the second drive frequency specifically include: the frame frequency information is decoded, decoding information is output, and the grating drive signal is generated according to the grating drive information; and according to the decoding information, the timing of the grating drive signal is adjusted, and the grating drive signal of the second drive frequency is output.

To sum up, in the display device and the drive method thereof provided by the embodiments of the present disclosure, the liquid crystal grating panel is arranged between the backlight module and the liquid crystal touch display panel, so that the liquid crystal grating panel cannot shield the touch electrode in the liquid crystal touch display panel to avoid the touch failure, and therefore, the touch sensitivity and accuracy of the display apparatus may be improved.

Although preferred embodiments of the present disclosure have been described, once those skilled in the art know the basic creative concept, they may perform additional changes and modifications on these embodiments. Therefore, attached claims are intended to be construed to include the preferred embodiments and all changes and modifications falling within the scope of the present disclosure.

Obviously, those skilled in the art may perform various alterations and variations on the embodiments of the present disclosure without departing from the spirit and scope of the embodiments of the present disclosure. Therefore, if the modifications and variations of the embodiments of the present disclosure fall within the claims of the present disclosure and the scope of the equivalent technology, the present disclosure is also intended to include such modifications and variations.

What is claimed is:

1. A display apparatus, comprising:
   a backlight module;
   a liquid crystal touch display panel, disposed on a light emitting side of the backlight module; and
   a liquid crystal grating panel, arranged between the backlight module and the liquid crystal touch display panel;
   wherein the liquid crystal grating panel comprises:
   a first array substrate, comprising a first base substrate and a first transparent electrode layer arranged between the first base substrate and the liquid crystal touch display panel, wherein the first transparent electrode layer is configured to receive an alternating current drive signal;
a first liquid crystal layer, arranged between the first array substrate and the liquid crystal touch display panel; and
a first opposite substrate, arranged between the first liquid crystal layer and the liquid crystal touch display panel, wherein the first opposite substrate comprises a second base substrate and a second transparent electrode layer arranged between the second base substrate and the first liquid crystal layer, the second transparent electrode layer is configured to receive a direct current drive signal;
wherein the first transparent electrode layer comprises:
a first sub-electrode layer, comprising a plurality of first strip electrodes arranged at intervals; and
a second sub-electrode layer, arranged between the first sub-electrode layer and the first liquid crystal layer, wherein the second sub-electrode layer comprises a plurality of second strip electrodes arranged at intervals, an extending direction of the first strip electrodes and an extending direction of are same, and an orthographic projection of the second strip electrodes on the first base substrate covers an orthographic projection of a region between two adjacent first strip electrodes on the first base substrate;
wherein the second transparent electrode layer comprises a planar electrode arranged in a whole surface mode.

2. The display apparatus according to claim 1, further comprising:
a first polarizer, arranged between the liquid crystal grating panel and the backlight module;
a second polarizer, arranged between the liquid crystal grating panel and the liquid crystal touch display panel; and
a third polarizer, disposed on a side of the liquid crystal touch display panel facing away from the liquid crystal grating panel.

3. The display apparatus according to claim 2, further comprising:
a multilayer film reflective polarizer, arranged between the first polarizer and the backlight module.

4. The display apparatus according to claim 2, further comprising: a first driver electrically connected with the liquid crystal touch display panel, a second driver electrically connected with the liquid crystal grating panel, and a master controller electrically connected with the first driver and the second driver;
wherein the master controller is configured to, according to a to-be-displayed image, send first refresh frequency information to the first driver, and send frame frequency information corresponding to the first refresh frequency information and grating drive information to the second driver, wherein a first refresh frequency carried by the first refresh frequency information is a same as a first frequency carried by the frame frequency information;
the first driver is configured to, according to the first refresh frequency information, adopt the first refresh frequency to drive the liquid crystal touch display panel to display the to-be-displayed image, and in a touch recognition stage, adopt a first drive frequency matched with the first refresh frequency to perform touch recognition; and
the second driver is configured to, adjust a drive frequency of the grating drive information according to the frame frequency information, and generate a grating drive signal of a second drive frequency, wherein the second drive frequency is different from both the first refresh frequency and the first drive frequency.

5. The display apparatus according to claim 4, wherein the second driver comprises:
a receiving circuit, configured to receive the frame frequency information and the grating drive information, decode the frame frequency information and output decoding information and the grating drive information;
a drive signal generating circuit, configured to generate a grating drive signal according to the grating drive information; and
a timing controller circuit, configured to adjust timing of the grating drive signal according to the decoding information and output a grating drive signal of the second drive frequency.

6. The display apparatus according to claim 1, further comprising: a first driver electrically connected with the liquid crystal touch display panel, a second driver electrically connected with the liquid crystal grating panel, and a master controller electrically connected with the first driver and the second driver;
wherein the master controller is configured to, according to a to-be-displayed image, send first refresh frequency information to the first driver, and send frame frequency information corresponding to the first refresh frequency information and grating drive information to the second driver, wherein a first refresh frequency carried by the first refresh frequency information is a same as a first frequency carried by the frame frequency information;
the first driver is configured to, according to the first refresh frequency information, adopt the first refresh frequency to drive the liquid crystal touch display panel to display the to-be-displayed image, and in a touch recognition stage, adopt a first drive frequency matched with the first refresh frequency to perform touch recognition; and
the second driver is configured to, adjust a drive frequency of the grating drive information according to the frame frequency information, and generate a grating drive signal of a second drive frequency, wherein the second drive frequency is different from both the first refresh frequency and the first drive frequency.

7. The display apparatus according to claim 6, wherein the second driver comprises:
a receiving circuit, configured to receive the frame frequency information and the grating drive information, decode the frame frequency information and output decoding information and the grating drive information;
a drive signal generating circuit, configured to generate a grating drive signal according to the grating drive information; and
a timing controller circuit, configured to adjust timing of the grating drive signal according to the decoding information and output a grating drive signal of the second drive frequency.

8. The display apparatus according to claim 7, wherein the timing controller circuit comprises:
a serial peripheral interface, configured to output the grating drive signal of the second drive frequency.

9. The display apparatus according to claim 7, wherein the second drive frequency is greater than the first refresh frequency, and the second drive frequency is smaller than the first drive frequency.

10. The display apparatus according to claim 9, wherein a difference between a drive frequency of the grating drive signal and the first refresh frequency is greater than or equal to 10 Hz and smaller than or equal to 25 Hz.

11. The display apparatus according to claim 6, wherein the second drive frequency is greater than the first refresh frequency, and the second drive frequency is smaller than the first drive frequency.

12. The display apparatus according to claim 11, wherein a difference between a drive frequency of the grating drive signal and the first refresh frequency is greater than or equal to 10 Hz and smaller than or equal to 25 Hz.

13. The display apparatus according to claim 6, wherein the liquid crystal grating panel comprises the first transparent electrode layer and the second transparent electrode layer; and the grating drive signal comprises the alternating current drive signal provided for the first transparent electrode and the direct current drive signal provided for the second transparent electrode layer.

14. A method for driving the display apparatus according to claim 1, comprising:

acquiring a to-be-displayed image in a three-dimensional display mode; and driving the liquid crystal touch display panel to display the to-be-displayed image, and driving a liquid crystal grating panel to form a light transmittance region and a dark state region which are arranged alternatively.

15. The method according to claim 14, wherein the display apparatus comprises a first driver, a second driver and a master controller;

the method further comprising: the master controller, according to the to-be-displayed image, sending first refresh frequency information to the first driver, and sending frame frequency information corresponding to the first refresh frequency information and grating drive information to the second driver, wherein a first refresh frequency carried by the first refresh frequency information is a same as a first frequency carried by the frame frequency information; wherein driving the liquid crystal touch display panel to display the to-be-displayed image, specifically comprising:

the first driver, according to the first refresh frequency information, adopting the first refresh frequency to drive the liquid crystal touch display panel to display the to-be-displayed image;

the method further comprising:

in a touch recognition stage, adopting the first drive frequency matched with the first refresh frequency to perform touch recognition; wherein driving the liquid crystal grating panel to form the light transmittance region and the dark state region arranged alternatively, specifically comprising:

the second driver, adjusting a drive frequency of the grating drive information according to the frame frequency information, and generating a grating drive signal of the second drive frequency, wherein the second drive frequency is different from both the first refresh frequency and the first drive frequency.

16. The method according to claim 15, wherein the second driver, adjusting the drive frequency of the grating drive information according to the frame frequency information, and generating the grating drive signal of the second drive frequency specifically comprise:

decoding the frame frequency information and outputting the decoding information, and generating the grating drive signal according to the grating drive information; and adjusting a timing of the grating drive signal according to the decoding information, and outputting a grating drive signal of the second drive frequency.

* * * * *